TRANSMISSION CONTROL IN TWO-WAY SIGNALING SYSTEMS

Filed Aug. 20, 1958 3 Sheets-Sheet 1

INVENTORS: G.W.GILMAN
G.A.PULLIS
E.G.SPACK
BY R. B. Andis
ATTORNEY

INVENTORS: G.W. GILMAN
G.A. PULLIS
E.G. SPACK
BY R. B. Ardis
ATTORNEY

TRANSMISSION CONTROL IN TWO-WAY SIGNALING SYSTEMS

Filed Aug. 20, 1958

G. W. GILMAN
INVENTORS: G. A. PULLIS
E. G. SPACK
BY R. B. Ardis
ATTORNEY 3,069,501

TRANSMISSION CONTROL IN TWO-WAY SIGNALING SYSTEMS

George W. Gilman, New York, N.Y., George A. Pullis, Middletown Township, Monmouth County, N.J., and Edward G. Spack, Ardsley, N.Y., assignors to Bell Telephone Laboratories, Incorporated, New York, N.Y., a corporation of New York Filed Aug. 20, 1958, Ser. No. 756,194
7 Claims. (Cl. 179—2)

This invention relates to echo suppressors for directionally controlling the transmission of signals in two-way communication systems, and particularly to circuits for disabling such suppressors.

Echo suppressors, as the term implies, are commonly used to prevent echoes of transmitted speech signals from being carried back to their source. On long overland circuits, for example, echo suppressors eliminate most of the objectionable echoes. Although echo suppressors thus find advantageous use insofar as the transmission of speech signals is concerned, they are a definite hindrance to simultaneous two-way transmission of data signals, as will become apparent in the ensuing discussion. It should be noted at this point that the data signals spoken of throughout this application are frequency-shift data signals comprising separate frequencies which, in carrier telegraph terminology, indicate "marks" or "spaces."

In a two-way telephone conversation the talkers normally speak one at a time. But the simultaneous two-way transmission of data signals is manifestly desirable. Well-known properties of echo suppressors, however, which properties will become more apparent in the ensuing discussion, have heretofore made simultaneous two-way transmission of data signals difficult if not impracticable. Thus, it would be possible to transmit data signals simultaneously in both directions over a toll circuit if the data signals transmitted in either direction were of equal amplitude at the echo suppressor; but, such equality is difficult to attain.

It would be desirable, therefore, if echo suppressors could be disabled whenever data signals are being transmitted over a toll circuit and yet be unaffected, i.e., operate normally on speech signals. This would be permissible since data terminals are ordinarily designed to be insensitive to echoes. That is, although it is often necessary to use echo suppressors in toll circuits during speech since echoes may be annoying to the talker, this precaution is usually not necessary where data signals are being sent since the data terminals are unaffected by echoes.

It is therefore an object of the invention to permit simultaneous, yet unhampered, transmission of frequency-shift data signals in both directions over toll circuits equipped with echo suppressors.

It is another object of the invention to enable freedom of selection of frequency-shift data signals to be used for the transmission of data over toll circuits equipped with echo suppressors.

It is still another object of the invention to achieve the foregoing objects and yet not affect the operation of the echo suppressors on normal speech signals.

By "normal speech" is meant an ordinary vocal interchange which, when converted to electrical energy, produces an erratic electrical wave of varying instantaneous frequency and amplitude. Abnormal speech, it should be noted, would be exemplified by humming or whistling sounds (i.e., sustained notes) which, upon conversion to electrical energy, produce waves of substantially uniform frequency and amplitude.

These objects are attained in accordance with the invention by using, in conjunction with an echo suppressor, a circuit for disabling the suppressor so that it is "transparent" to data signals yet normally operative insofar as speech signals are concerned. In one form, the disabler circuit includes a logical "OR" circuit and a thermal time delay relay for disabling the echo suppressor when frequency-shift data signals are transmitted in either direction over the toll circuit. The thermal relay has a predetermined time delay interval of such duration that the transmission of speech signals in either direction over the toll circuit will not cause the disabler circuit to disable the echo suppressor. It will be noted, however, that abnormal speech signals (e.g., the sustained notes previously mentioned) could have a sufficient period of sustained amplitude to overcome the time delay of the thermal relay, operate that relay, and thereby disable the suppressor. This would not be true of "normal" speech signals. In another form, the disabler circuit includes a logical "AND" circuit for disabling the suppressor only when frequency-shift data signals are transmitted simultaneously in both directions over the toll circuit.

The invention, including its various features and objects, will be more fully appreciated from a consideration of the following more detailed description read in conjunction with the accompanying drawing, in which.

Figure 1:
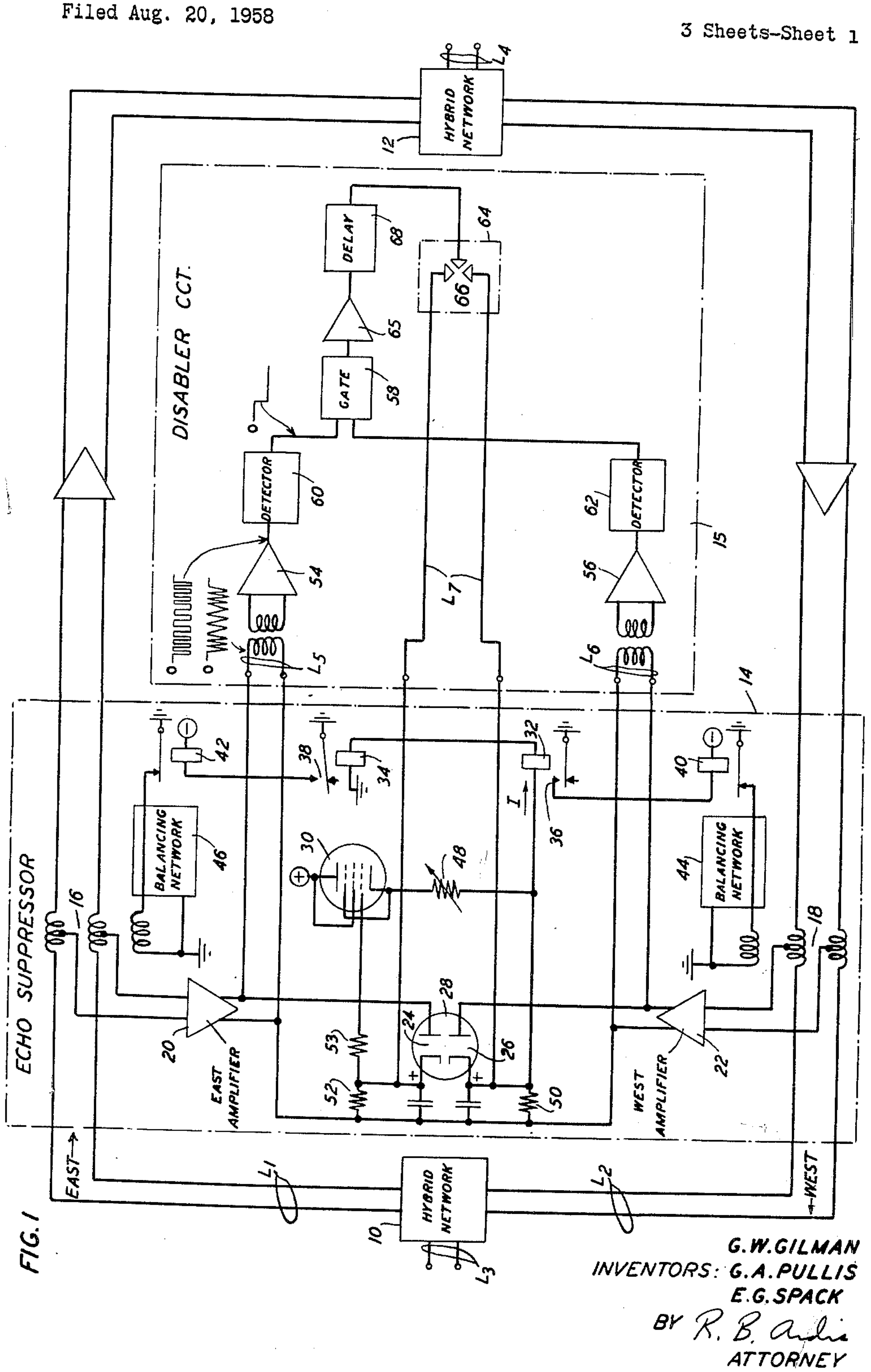
FIG. 1 is a partially schematic diagram of a two-way signaling system including an echo suppressor and a disabler circuit for disabling the suppressor.

The four-wire toll telephone circuit of FIG. 1 comprises a one-way signal transmission path $L_1$ for transmitting signals in the direction from west to east and a one-way signal transmission path $L_2$ for transmitting signals in the direction from east to west. The input of the path $L_1$ and the output of the path $L_2$ are coupled at the west hybrid network 10 of the four-wire circuit in conjugate relation with each other and in energy transmitting relation with the two-way telephone line $L_3$ in a manner well known. So, too, the output of the path $L_1$ and the input of the path $L_2$ are coupled at the east hybrid network 12 in conjugate relation with each other and in energy transmitting relation with the two-way telephone line $L_4$.

The echo suppressor 14 is of a differential type well known in the art. Only details which are believed helpful in the discussion of the present invention are shown. The suppressor 14 is generally used to suppress echoes on four-wire voice frequency circuits or carrier channels. The two sides of the suppressor, one connected to the transmission path $L_1$ and the other to the transmission path $L_2$, are differentially interconnected so that the operation of the suppressor is dependent upon a difference between the signal levels in the two directions of transmission.

Briefly, the suppressor circuit 14 consists of the following components:

The two hybrid coils 16 and 18 are placed respectively in the east and west transmission paths. The suppression loss is supplied by the suppressor to the transmission path having the weaker signal level whenever there is a difference between the signal levels of the transmission paths $L_1$ and $L_2$; and this is done by balancing the hybrid coil inserted in the path having the weaker signal level.

The bridge points of the hybrid coils 16 and 18 are connected respectively to the control amplifiers 20 (the "east" amplifier) and 22 (the "west" amplifier). The output circuits of control amplifiers 20 and 22 are, in turn, respectively coupled to a pair of differentially-connected detectors 24 and 26, i.e., are connected to the common double-diode rectifier tube 28. The output of the rectifier tube 28 is used to control the plate current of a direct-current amplifier tube 30, in the cathode circuit of which are connected the operating windings of the master relays 32 and 34. The contacts 36 and 38 of the master relays 32 and 34 control the suppression relays 40 and 42, respectively.

The suppression relays 40 and 42 in turn respectively control the balancing, via balancing networks 44 and 46, of the hybrid coils 18 and 16. The suppression relays thus apply and remove suppression loss from the transmission paths $L_1$ and $L_2$. When, for example, suppression relay 42 is in its inoperative state (as shown), balancing network 46 is by-passed to ground, the hybrid coil 16 is unbalanced, and substantially no loss is inserted in the transmission path $L_1$. When, however, suppression relay 42 is activated, the balancing network 46 balances the hybrid coil 16 and signals conducted over transmission path $L_1$ are suppressed.

It will be helpful in the ensuing discussion of the echo suppressor disabler circuit 15 if the principles of operation of the echo suppressor are first discussed.

A small portion of the signal energy in the transmission path $L_1$ is intercepted at the bridge points of the hybrid coil 16 and supplied to the control amplifier 20. In the same manner, the control amplifier 22 is supplied with a small portion of the signal energy transmitted in the westerly direction over transmission path $L_2$. The signal energy supplied to the control amplifiers 20 and 22 is then amplified and supplied to the next stage of the suppressor circuit, the rectifier tube 28.

Any difference in the instantaneous potentials supplied by the control amplifiers determines the grid bias potential of the direct-current amplifier 30, since the grid bias of the tube is determined by the net voltage drop across the series combination of the variable resistor 48 and the resistors 50, 52, and 53. It will be noted that an increase in the output of the control amplifier 20 will decrease the negative bias of the direct-current amplifier 30, while an increase in the output of the control amplifier 22 will increase this negative bias. Since the plate current I of the amplifier 30 is controlled by the grid bias thereof, it can be seen then that an increase in the signal energy transmitted over the transmission path $L_1$ will increase this plate current while a similar increase in the transmission path $L_2$ will have the opposite effect.

When low-level signals (or none at all) are fed to the suppressor 14 through the transmission paths $L_1$ and $L_2$, the plate current I of the direct-current amplifier 30 is at its normal value, at which value the relay 32 is non-operated and the relay 34 is operated. It will be noted, therefore, that the current required to operate the relay 34 is less than that required to operate the relay 32. Thus, when the current I is at its normal value the relay 40 is non-operated, applying a ground to short-circuit the balancing network 44; and the relay 42, also non-operated, short-circuits the balancing network 46. Under this condition the losses inserted in the transmission paths $L_1$ and $L_2$ by the hybrid coils 16 and 18 are small.

If, now, a subscriber—at the western end of the line $L_3$, for example—whose speech is transmitted in the easterly direction over the transmission path $L_1$, delivers sufficient volume (i.e., speaks loudly enough), the plate current I of the amplifier 30 is increased and relay 32 operates. Operation of relay 32 operates relay 40. Relay 40, in turn, removes the short circuit from the hybrid balancing network 44, thus inserting a large suppression loss in the westerly transmission path $L_2$. Echoes returning from the eastern end of the line $L_4$, westerly over the transmission path $L_2$, are attenuated by this suppression loss and are thus effectively prevented from reaching the subscriber at the western end of the line $L_3$. When the subscriber's speech ceases in the transmission path $L_1$, the relay 32 releases immediately but relay 40 remains operative long enough to suppress the trailing echoes of speech energy from the eastern end of line $L_4$. The relay 40 then releases, restoring the suppressor to its normal condition (as shown) with low loss in both of the transmission paths $L_1$ and $L_2$.

Figure 2:
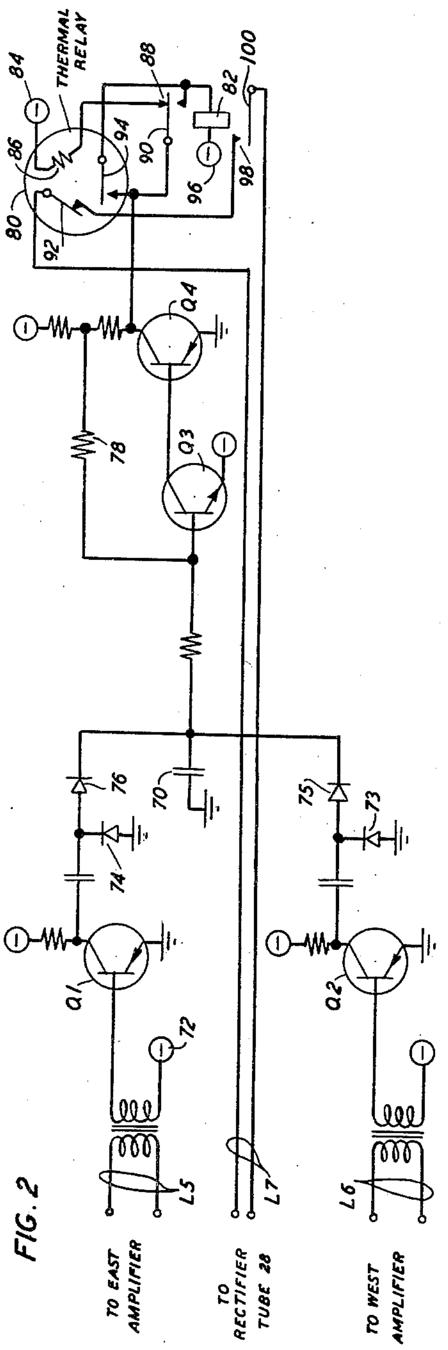
FIG. 2 is a detailed circuit diagram of one illustrative embodiment of the disabler circuit of FIG. 1.

The disabler circuit 15, which disables the echo suppressor 14 when frequency-shift data signals (see FIG. 5) are transmitted over the four-wire, two-way signaling system of FIG. 1, will now be described. The amplifiers 54 and 56 are bridged respectively across the outputs of the control amplifiers 20 and 22 by the wire pairs $L_5$ and $L_6$. Amplifiers 54 and 56 have high input impedances so as to have substantially no effect on the outputs of amplifiers 20 and 22. A gate 58, which may be an "AND" gate as in FIG. 6 or an "OR" gate as in FIG. 2, is coupled to the amplifiers 54 and 56 by the detector circuits 60 and 62.

If gate 58 is an "AND" gate, it will be noted that there must be simultaneous transmission of frequency-shift data signals in both directions over the two-way communication system if the gate 58 is to be enabled. On the other hand, if gate 58 is an "OR" gate, frequency-shift data signals need be transmitted in only one direction over the two-way communication system in order to enable the gate 58.

Coupling the gate circuit 58 to the switching circuit 64 is an amplifier 65 and a delay circuit 68. As indicated in FIG. 1, the switching circuit 64 is operative (i.e., the switch 66 is closed) when gate 58 is enabled. When switch 66 is closed, the cathodes of the differentially-connected detector circuits 24 and 26 of FIG. 1 are short-circuited by way of the wire pair $L_7$. Short-circuiting these cathodes causes the plate current I of the direct-current amplifier 30 to be maintained at its normal value and the echo suppressor 14 is thus disabled.

The delay circuit 68 provides a predetermined delay interval which is slightly greater than the probable duration of sustained potential of normal speech signals. That this will render the disabler circuit responsive only to frequency-shift data signals to the exclusion of normal speech signals may be understood from a consideration of FIG. 5. Note the erratic excursion of the typical speech signal 67 and the continuity and uniformity of potential of the frequency-shift data signal 69. Thus, even though speech signals are transmitted over the transmission paths $L_1$ and $L_2$, they will not be effective to disable the echo suppressor 14, since they normally will not be sufficiently continuous to overcome the delay period of the delay circuit 68.

One illustrative embodiment of the disabler circuit 15 is shown in FIG. 2. In FIG. 2 the gate 58 of FIG. 1 is an "OR" gate whose function is provided by the diodes 73, 74, 75, and 76 and by the condenser 70. These diodes also perform the detecting function of the detector circuits 60 and 62 of FIG. 1. In the "OR" type disabler circuit frequency-shift data signals need be transmitted in only one of the transmission paths $L_1$ and $L_2$ in order to operate the disabler circuit 15 and thereby disable the suppressor circuit 14.

Figure 4:
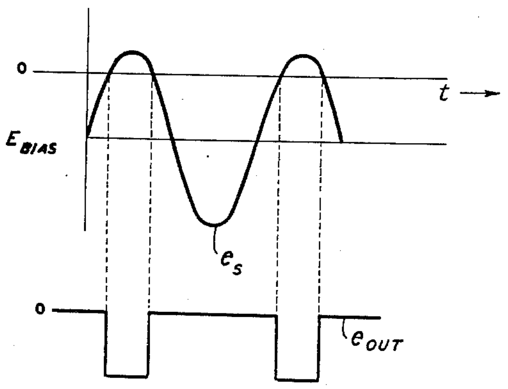
FIG. 4 is a plot of wave forms explaining the operation of the input amplifier of the disabler circuit shown in block form in FIG. 1 and more detailed form in FIG. 2.

The amplifiers 54 and 56 of FIG. 1 are shown respectively as the transistor amplifiers $Q_1$ and $Q_2$. The operation of the amplifiers $Q_1$ and $Q_2$ is best described with respect to FIG. 4. Thus, assuming the signal $e_3$ to be a frequency-shift data signal supplied to the amplifier $Q_1$ by way of the control amplifier 20 and the wire pair $L_5$, it will be noted that the output of the transistor $Q_1$ is at ground potential during those times when the signal $e_s$ is not sufficiently positive to overcome the negative potential $E_{bias}$ of the bias source 72. When the signal $e_s$ does become sufficiently positive, a negative pulse is produced at the output of the transistor $Q_1$, as illustrated by the signal $e_{out}$. These negative pulses are then detected by the diode detectors 74 and 76 and supplied to the capacitor 70, which smooths the pulses and in turn supplies them to the amplifier combination of transistors $Q_3$ and $Q_4$. A resistor 78 regeneratively intercouples the output of transistor $Q_4$ to the input of transistor $Q_3$ so that the output of the transistor combination $Q_3$—$Q_4$ may be full ON or full OFF with a minimum transient response.

The next stage of the disabler circuit combines the switching and delay functions performed by the delay circuit 68 and switching circuit 64 of FIG. 1. This latter stage comprises a thermal time delay relay 80 and an auxiliary relay 82. The delay period of the thermal relay 80 is dependent primarily on its cooling period. Relay 80 has a rapid reset feature which prevents the disabler from operating on speech. This feature assures that noncontiguous periods during which a typical speech signal (see FIG. 5) is of sufficient amplitude and frequency to fulfill the input requirements (see FIG. 3) of the disabler circuit, will not "bridge over," i.e., accumulate to overcome the time delay of relay 80.

The operation of the delay circuit comprising the relays 80 and 82 is dependent upon the turning on of transistor $Q_4$. When transistor $Q_4$ is turned on, i.e., rendered conductive, a path is completed from the potential source 84 to ground via the heater 86 of the thermal relay 80, the contacts 88 and 90 of the relay 82, and the collector-emitter path of the transistor $Q_4$. The heater 86 begins heating and opens contact 92; then, after a fraction of the overall delay period provided by the thermal relay 80, contact 94 closes a path for supplying current from source 96 to operate relay 82. When thus operated, relay 82 opens the contacts 88 and 90, thereby beginning the cooling period for the heater 86, and also closes the contacts 98 and 100. Contact 94 thereupon opens and, at the end of the cooling period of the heater 86, contact 92 again closes to complete the path around the wire pair $L_7$. Completion of this path short-circuits the cathodes of the differentially-connected detectors 24 and 26 of FIG. 1; whereupon the suppressor 14 is disabled.

Figure 3:
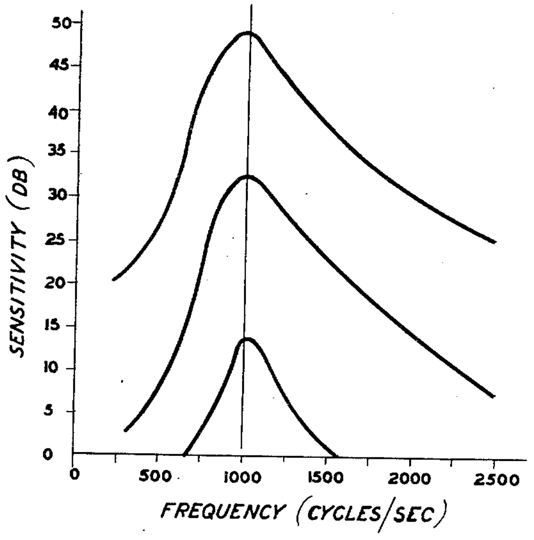
FIG. 3 is a plot of sensitivity versus frequency characteristics of the disabler circuit of FIG. 2.

Sensitivity versus frequency characteristics of a typical differentially-operated echo suppressor are shown in FIG. 3. The gain, and hence the suppressor sensitivity, of the control amplifiers 20 and 22 (FIG. 1) may be adjusted over a substantial decibel range by varying the input level of these amplifiers. The amplifiers each include a tuned input circuit; tuned, in the present illustrative example, for maximum sensitivity at 1000 cycles per second. The three curves shown in FIG. 3 are merely illustrative and represent possible settings of the sensitivity of amplifiers 20 and 22. "Sensitivity" as used here may be defined as the maximum loss which can be inserted between a 600-ohm source of one milliwatt testing power and the input of one side of the suppressor (e.g., the input of amplifier 20 in FIG. 1) in order to cause that side of the suppressor to be just operated when power is supplied from the source.

The sensitivity versus frequency characteristic of the echo suppressor disabler circuit is the same as that of the suppressor. Hence, in order that the disabler circuit be operated by a frequency-shift data signal, the signal must not only be of sufficient level but must comprise frequencies reasonably proximate to the frequency at which the control amplifiers 20 and 22 are tuned. As mentioned, in a representative suppressor this frequency would be approximately 1000 cycles per second. Consequently, a frequency-shift data signal, if it were to operate the disabler circuit and thereby disable the suppressor, would probably comprise, for example, the frequencies 1100 cycles per second (which could be, say, the "marking" frequency) and 1900 cycles per second (the "spacing" frequency). At these frequencies, as will be noted in FIG. 3, the typical suppressor, and hence the disabler circuit 15 of FIG. 2, is sufficiently sensitive to ensure disablement of the suppressor when the data signal is manifest at either side thereof.

This illustrates a unique feature of the "OR" gate form of the disabler circuit as illustrated in FIG. 1; for in the two-way simultaneous transmission of frequency-shift data signals over a signaling system, only one of the signals need comprise frequencies falling within the sensitive region of the suppressor and disabler response curves (see FIG. 3). The second signal, transmitted in the reverse direction (a check signal, for example), can comprise frequencies outside this region. Thus, in accordance with the invention, greater freedom is allowed in the choice of the frequencies of the second signal with a concomitant lessening of interference problems when the two data signals are combined in the two-wire portions (lines $L_3$ and $L_4$ of FIG. 1) of the signaling system.

Figure 6:
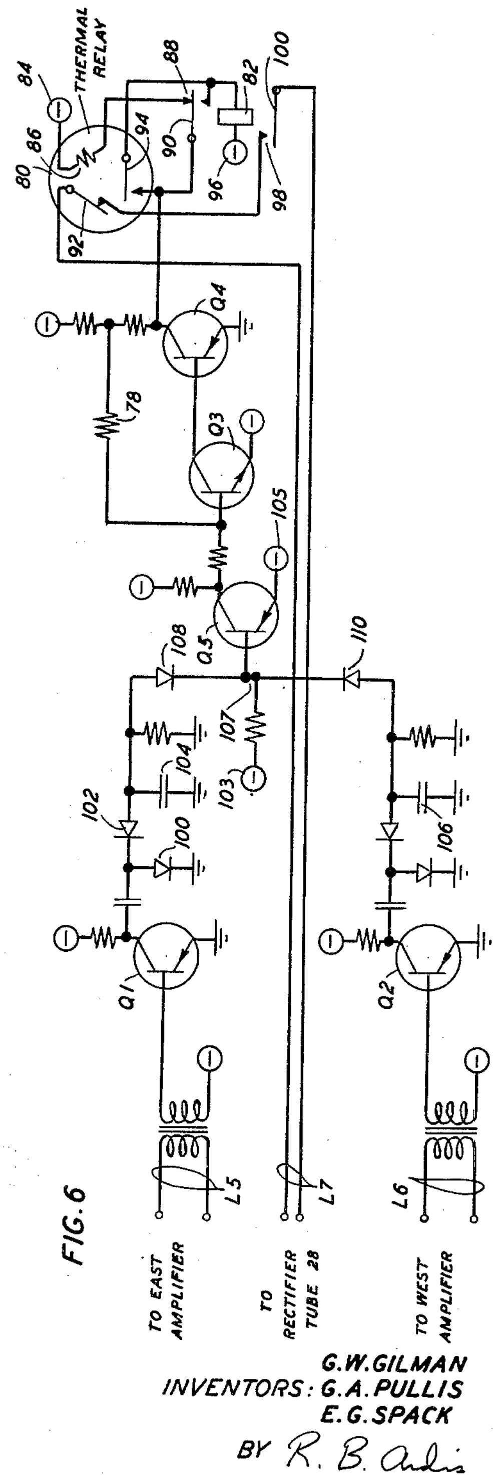
FIG. 6 is a detailed circuit diagram of another illustrative embodiment of the disabler circuit of FIG. 1.

FIG. 6 illustrates another form of the disabler circuit of FIG. 1. This form may conveniently be called the "AND" form in that an "AND" gate is used instead of the "OR" gate of FIG. 2. It may be desired in certain instances to disable the echo suppressor only when data signals comprising frequencies falling within the sensitive region of the suppressor and disabler response curves of FIG. 3 are transmitted simultaneously in both directions over the signaling system. In the majority of cases, however, the "OR" type disabler circuit (FIG. 2) will be used in view of the already discussed advantageous feature thereof, permitting freedom of choice of data frequencies in one direction over the signaling system.

The "AND" type disabler circuit of FIG. 6 will now be described. As in the discussion with respect to FIG. 2, transistors $Q_1$ and $Q_2$ produce amplified, square-wave outputs in response to data signals (see, e.g., FIG. 4) derived from the outputs of the control amplifiers 20 and 22 of FIG. 1. The input circuit to transistor $Q_5$ via transistor $Q_1$ is the same as that via transistor $Q_2$ so that only one of these input circuits need be described. The output of transistor $Q_1$, for example, is connected to the diode detectors 100 and 102 which build up a negative potential on the capacitor 104. It should be noted that when either of the diodes 108 and 110 is forward-biased completing a path from ground to source 103, the potential of source 105 is less negative than (i.e., is positive with respect to) that of juncture 107 and, accordingly, transistor $Q_5$ is nonconductive. When, however, data signals are being sent simultaneously in both directions over the signaling system, the resulting negative potentials on capacitors 104 and 106 respectively back bias diodes 108 and 110. The potential of juncture 107 then becomes more negative than that of source 105, permitting transistor $Q_5$ to conduct and turn on transistor $Q_3$. The remainder of the disabler circuit of FIG. 6 is identical to that of FIG. 2 and requires little additional description. The transistors $Q_3$ and $Q_4$, as previously mentioned, have positive feedback through resistor 78 to provide definite ON-OFF action for controlling the delay circuit comprising the thermal relay 80. Thus the simultaneous transmission of frequency-shift data signals in both directions over the signaling system of FIG. 1 will cause the disabler circuit 15 to disable the echo suppressor 14 when the disabler circuit is of the "AND" type illustrated in FIG. 6.

Figure 5:
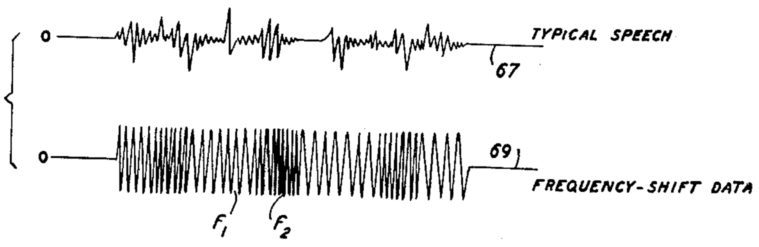
FIG. 5 is another plot of wave forms which is helpful in pointing out the pertinent differences between frequency-shift data signals and normal speech signals, and in discussing their respective effects on an echo suppressor disabler circuit arranged in accordance with the invention.

It should be noted that several factors combine to prevent the operation of the disabler circuit of FIG. 1 in response to normal speech even though the talkers speak simultaneously. In the first place, it can be seen that the typical speech wave form of FIG. 5 is too erratic a majority of the time to meet the signal level requirements which may be deduced from a consideration of the sensitivity versus frequency characteristics of FIG. 3.

Secondly, the thermal time delay relay 80 (represented as the delay circuit 68 in FIG. 1) requires that the amplitude of signals received at either or both sides of the suppressor circuit 14 be sustained for a sufficient period of time to overcome the time delay of the relay. This time delay is set at a value slightly greater than the probable sustained duration of sufficient amplitude level of any portion of a typical speech wave. Four to five seconds delay, for example, would make the operation of the disabler circuit by a normal speech signal very improbable. Finally, the rapid reset time of the thermal relay 80 ensures that noncontiguous portions of the speech wave will not work together to fulfill the time delay requisite of relay 80.

It may be noted that the disabler circuit 15 can be manufactured as an applique unit appendable to existing echo suppressors, or can be manufactured as an integral part of future suppressors. Thus, in accordance with the invention, a relatively simple circuit makes possible the unhampered simultaneous transmission of data signals over circuits equipped with echo suppressors and yet in no way affects the operation of the suppressor on normal speech signals.

It will be understood, however, that the present invention should not be construed as limited to frequency-shift signaling. One can readily see that other types of signals, for which unhampered transmission may be desired, may be sufficiently continuous and uniform in amplitude to cause an echo suppressor disabler circuit, arranged in accordance with the invention, to disable its associated suppressor. Moreover, modifications of the disabler circuits as shown in the illustrative embodiments may be made by one skilled in the art so that the modified disabler circuits will be responsive to signals other than frequency-shift signals. In short, although the invention has been described only in connection with specific embodiments, they should be considered as merely illustrative, for the invention also encompasses such other embodiments as come within its spirit and scope.

What is claimed is:

1. In a two-way signaling system for the transmission of both speech signals of varying instantaneous amplitude and data signals of substantially constant instantaneous amplitude, the combination of an echo suppressor and a disabling circuit for disabling said echo suppressor, said suppressor being of the differential type for suppressing signals transmitted in one direction over said two-way signaling system when electrically stronger signals are transmitted in the other direction, having two sides each associated individually with one of the directions of transmission over said two-way signaling system, and including a pair of differentially-connected detector circuits for determining which of said signals transmitted over said two-way signaling system is electrically stronger, said disabler circuit comprising means rendering said disabler circuit responsive only to said signals of substantially constant instantaneous amplitude, and means interconnecting said echo suppressor and said disabler circuit including means for connecting said differentially-connected detector circuits in short-circuit relationship in response to said data signals.

2. In a two-way signaling system for the transmission of both speech signals of varying instantaneous amplitude and data signals of substantially constant instantaneous amplitude, the combination of an echo suppressor and a disabler circuit for disabling said echo suppressor, said suppressor being of the differential type for suppressing signals transmitted in one direction over said two-way signaling system when electrically stronger signals are transmitted in the other direction, having two sides each associated individually with one of the directions of transmission over said two-way signaling system, and including a pair of differentially-connected detector circuits for determining which of said signals transmitted over said two-way signaling system is electrically stronger, said disabler circuit comprising means rendering said disabler circuit responsive only to said signals of substantially constant instantaneous amplitude, an "AND" gate, means coupling said "AND" gate to both sides of said two-way signaling system, said "AND" gate producing an output in response to the simultaneous transmission of signals in both directions over said two-way signaling system, and means for delaying the disablement of said suppressor for a predetermined interval slightly greater than the probable duration of sustained amplitude of a normal speech signal, whereby said disabler circuit is operative to disable said suppressor in delayed response to the transmission of said data signals simultaneously in both directions over said two-way signaling system but is normally inoperative to disable said suppressor when speech signals are transmitted simultaneously in both directions over said system, and means interconnecting said echo suppressor and said disabler circuit.

3. In a two-way signaling system for the transmission of both speech signals of varying instantaneous amplitude and data signals of substantially constant instantaneous amplitude, the combination of an echo suppressor and a disabler circuit for disabling said echo suppressor, said suppressor being of the differential type for suppressing signals transmitted in one direction over said two-way signaling system when electrically stronger signals are transmitted in the other direction, having two sides each associated individually with one of the directions of transmission over said two-way signaling system, and including a pair of differentially-connected detector circuits for determining which of said signals transmitted over said two-way signaling system is electrically stronger, said disabler circuit comprising means rendering said disabler circuit responsive only to said signals of substantially constant instantaneous amplitude, and means interconnecting said echo suppressor and said disabler circuit comprising a pair of amplifiers each having a high input impedance and each bridged individually across one side of said suppressor and detector means, said disabler circuit also comprising an "AND" gate having a pair of inputs, said last-named detector means individually coupling each of said amplifiers to one of said "AND" gate inputs, and said disabler circuit operating to disable said suppressor in response to the simultaneous transmission of said data signals in both directions over said signaling system.

4. A disabler circuit for disabling the differentially-connected detector circuits of an echo suppressor when frequency-shift data signals are sent in either direction over the two-way signaling system of which the suppressor is a part, and thereby disabling the echo suppressor itself, comprising a pair of amplifiers, each having a high input impedance and each bridged individually across one side of said suppressor for the reception of signals transmitted in either direction over said two-way signaling system, a pair of detector circuits for detecting signals at the outputs of said amplifiers, an "OR" gate, switching means responsive to the enablement of said "OR" gate, and delay means for delaying the operation of said switching means for a predetermined period after the enablement of said "OR" gate, each of said last-named detector circuits individually coupling one of said amplifiers to said "OR" gate, said delay period of said delay means being susbtantially equal to but greater than the probable duration of sustained amplitude of any portion of a normal speech signal, said switching means operating to disable said differentially-connected detector circuits and thereby disable said echo suppressor whenever said data signals are transmitted in either direction over said two-way signaling system.

5. A disabler circuit in accordance with claim 4 wherein said delay means comprises a thermal time-delay relay having a rapid reset time.

6. A disabler circuit in accordance with claim 4 having a sensitivity versus frequency characteirstic sensitive to the frequency components of at least one of said data signals sent in either direction over said signaling system.

7. A disabler circuit in accordance with claim 4 wherein said switching means for disabling said differentially-connected detector circuits of said echo suppressor couple said differentially-connected detector circuits in short circuit relationship when said switching means is rendered operative in delayed response to the enablement of said "OR" gate.

References Cited in the file of this patent

UNITED STATES PATENTS

| | | |
|---|---|---|
| 2,274,392 | Abraham | Feb. 24, 1942 |
| 2,306,689 | Davis et al. | Dec. 29, 1942 |
| 2,352,081 | Davis | June 20, 1944 |
| 2,355,958 | Davis | Aug. 15, 1944 |
| 2,356,943 | Norwine | Aug. 29, 1944 |
| 2,702,319 | Ryall | Feb. 15, 1955 |
| 2,825,764 | Edwards et al. | Mar. 4, 1958 |